United States Patent
Nishikawa

(10) Patent No.: US 9,542,127 B2
(45) Date of Patent: Jan. 10, 2017

(54) IMAGE PROCESSING METHOD AND IMAGE PROCESSING APPARATUS

(71) Applicant: CANON KABUSHIKI KAISHA, Tokyo (JP)

(72) Inventor: Naoyuki Nishikawa, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/710,854

(22) Filed: May 13, 2015

(65) Prior Publication Data

US 2015/0331643 A1    Nov. 19, 2015

(30) Foreign Application Priority Data

May 19, 2014 (JP) ................................. 2014-103651

(51) Int. Cl.
G06F 3/12 (2006.01)
G06T 1/20 (2006.01)
G06T 7/00 (2006.01)

(52) U.S. Cl.
CPC .............. *G06F 3/12* (2013.01); *G06F 3/124* (2013.01); *G06F 3/1215* (2013.01); *G06F 3/1248* (2013.01); *G06F 3/1298* (2013.01); *G06T 1/20* (2013.01); *G06T 7/0083* (2013.01); *G06T 7/0085* (2013.01); *G06T 2207/20116* (2013.01); *H04N 2201/0094* (2013.01)

(58) Field of Classification Search
CPC ...... G06F 3/124; G06F 3/1215; G06F 3/1248; G06F 3/12; G06F 3/1298; G06T 1/20; G06T 7/0083; G06T 2207/20116; G06T 7/0085; H04N 2201/0094

See application file for complete search history.

(56) References Cited

U.S. PATENT DOCUMENTS

| 8,804,145 B2 | 8/2014 | Nishikawa |
| 2010/0128927 A1* | 5/2010 | Ikenoue ............... G06T 7/0083 382/103 |
| 2012/0229834 A1* | 9/2012 | Nishikawa ......... G06K 15/1822 358/1.13 |

FOREIGN PATENT DOCUMENTS

| JP | 04170686 A | 6/1992 |
| JP | 08072317 A | 3/1996 |
| JP | 2003051019 A | 2/2003 |
| JP | 2005267290 A | 9/2005 |
| JP | 2007122188 A | 5/2007 |
| JP | 2012185697 A | 9/2012 |

OTHER PUBLICATIONS

David F. Rogers, "Procedural Elements for Computer Graphics," McGraw-Hill Eduction, issued on Oct. 1, 1997, ISBN-10:0070535485.

* cited by examiner

*Primary Examiner* — Iriana Cruz
(74) *Attorney, Agent, or Firm* — Rossi, Kimms & McDowell LLP

(57) ABSTRACT

A page containing a large number of graphics and therefore having a high process load can be processed in parallel and quickly by dividing an edge extraction process into a plurality of threads. In this case, if the number of cores is eight, the edge extraction process is performed by allocating four cores to one of regions obtained by dividing a page and the remaining four cores to the other region.

10 Claims, 13 Drawing Sheets

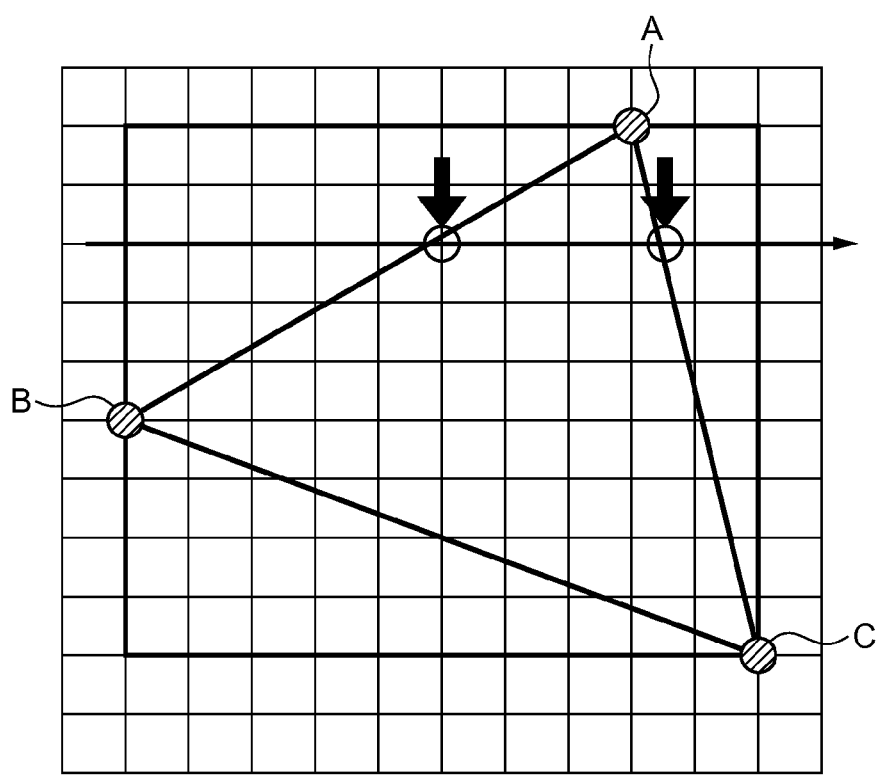
F I G. 4

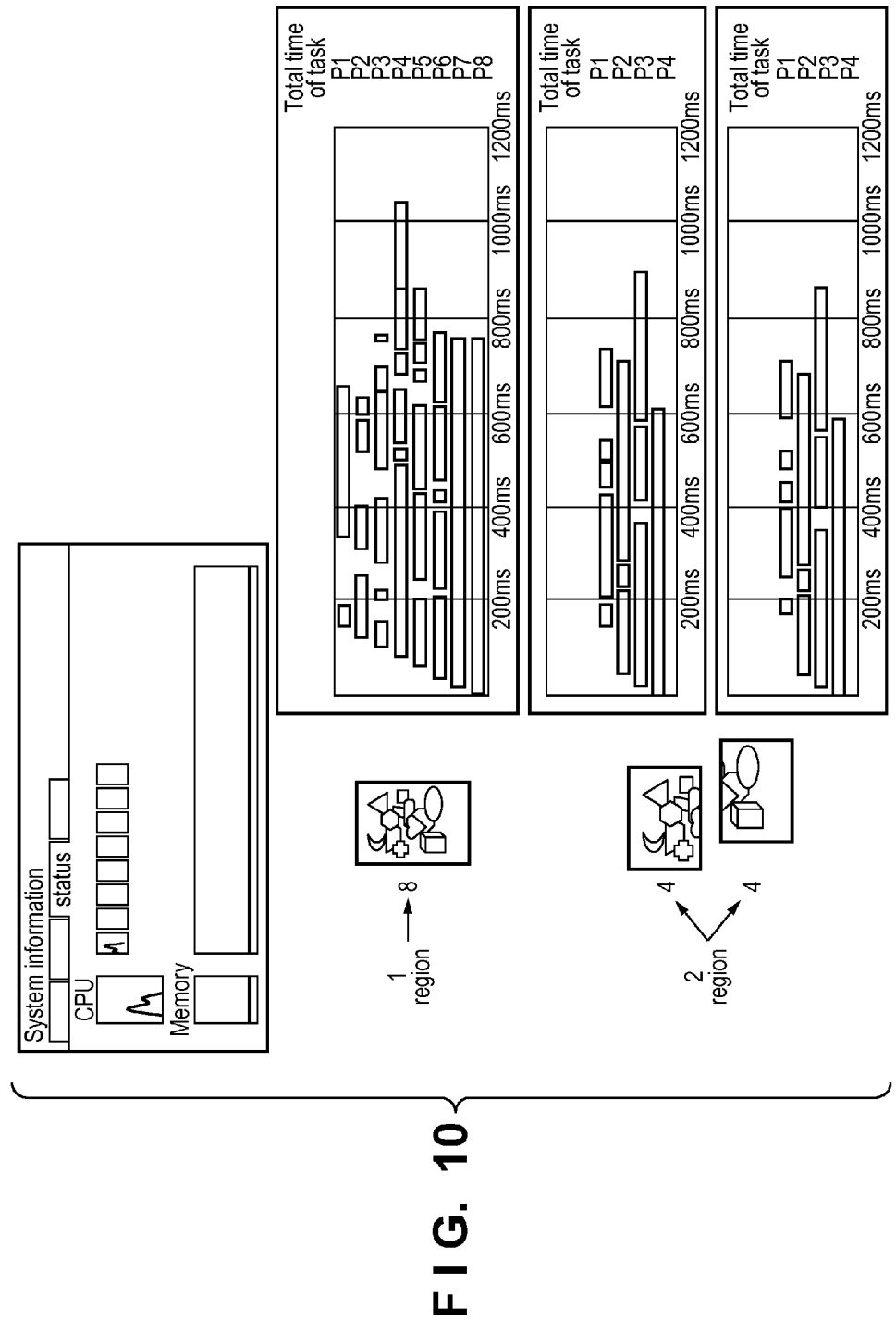
F I G. 10

IMAGE PROCESSING METHOD AND IMAGE PROCESSING APPARATUS

BACKGROUND OF THE INVENTION

Field of the Invention

The present invention relates to image processing apparatuses for performing image processing for printing a variety of image information such as characters, photographs, graphics, and the like. More specifically, the present invention relates to a process of accelerating generation of an image such as graphics and the like.

Description of the Related Art

Conventionally, rendering is the commonly used technique of generating an image based on contour information (also referred to as edge information) of a graphic which is extracted from coordinate information or the like of the graphic for generation of an image of the graphic (e.g., Japanese Patent Laid-Open Nos. 04-170686, 08-72317, 2005-267290, and 2007-122188). Contour information is represented by straight lines. The DDA algorithm is a known technique of representing straight lines (David Rogers, "Procedural Elements for Computer Graphics," McGraw-Hill Education, issued on Oct. 1, 1997, ISBN-10:0070535485).

A conventional renderer system employs so-called banding, in which one page of data is divided into bands which are to be processed. Such a system has a problem with graphics processing that when a page containing a large number of graphical objects is input, the rendering speed decreases. To address such a problem, a technique has been proposed in which when a page is divided into bands, a separate processing unit (thread) is allocated to each band so that the processing speed may be improved (Japanese Patent Laid-Open No. 2003-51019).

Japanese Patent Laid-Open No. 2012-185697 describes a system which allocates a processing unit (thread) to each graphic to process the graphics in parallel so that the overall parallelism may be increased in order to increase the processing speed. Edge information extracted from graphics is mapped back to their coordinate points on the page, and are synthesized or combined together. These processes can be separately performed. A thread can be allocated to each of the process of extracting edges from each graphic and the process (data synthesis) of merging data obtained by the extraction processes. If the environment in which rendering is performed has multiple CPUs or a multi-core CPU, a parallel operation can be performed in which a core thread process is mapped to an execution unit (processor core, which is also simply referred to as a core) which performs the core thread process so that each core performs a process in a time-independent manner. In such a system, the processing speed can be increased by increasing the utilization rate of each processor core and thereby exploiting the capability of the core.

In multi-core CPUs, however, the execution speed varies depending on the memory access pattern, which leads to a problem that the speed of the conventional thread allocation algorithm is not improved more than expected.

SUMMARY OF THE INVENTION

With the above conventional examples in mind, the present invention has been made. An image processing apparatus and method are provided in which CPU cores are appropriately allocated to a page having a high processing load, thereby improving the efficiency of rendering.

The present invention has the following features.

According to one aspect of the present invention, there is provided an image processing apparatus including a multi-core CPU and capable of performing a process using multiple threads, comprising: an edge extraction unit that performs an edge extraction process as a thread performed by a separate processor core for each object contained in PDL data; a synthesis unit that synthesize edge information extracted from the objects; and a unit that generates raster image data based on the synthesized edge information obtained by the synthesis unit, wherein the edge extraction unit performs the edge extraction process by allocating a predetermined number of threads to each of regions obtained by dividing one page.

According to the present invention, the processing efficiency of rendering can be improved. As a result, the possibility of a stall of a printer engine can be reduced, whereby high-speed printing can be provided.

Further features of the present invention will become apparent from the following description of exemplary embodiments with reference to the attached drawings.

BRIEF DESCRIPTION OF THE DRAWINGS

FIG. 4 is a conceptual diagram showing how an edge extraction process is performed on a graphic.

FIG. 10 is a task processing graph for describing advantages of application of the first embodiment of the present invention.

DESCRIPTION OF THE EMBODIMENTS

Embodiments of the present invention will now be described with reference to the accompanying drawings.

First Embodiment

Figure 1:
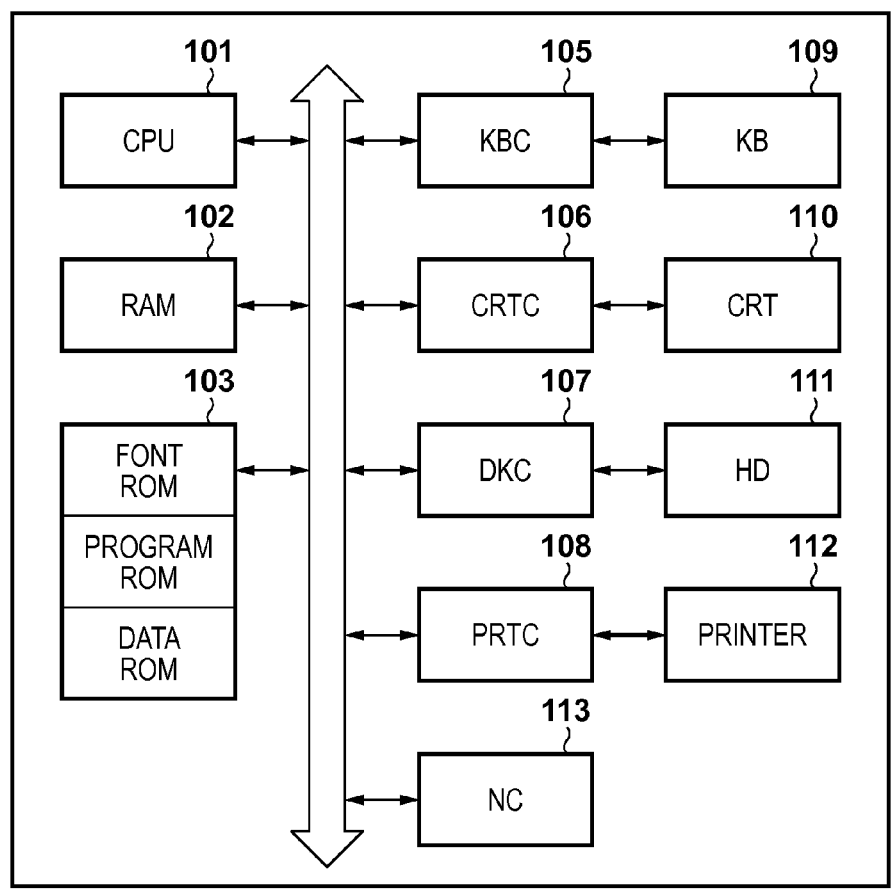
FIG. 1 is a schematic diagram showing an example hardware configuration of an image processing apparatus.

FIG. 1 is a diagram showing an example hardware configuration of an image processing apparatus 100. In FIG. 1, a CPU 101 executes a program such as an OS, common application, or the like which is loaded from a ROM 103 or hard disk 111 to a RAM 102 to carry out a software function or flowchart process described below. The RAM 102 functions as a main memory, work area, or the like of the CPU 101. A keyboard controller (KBC) 105 controls a key input from a keyboard 109 or a pointing device (not shown). A display controller 106 controls a display on a display 110. A disk controller (DKC) 107 controls access to an external memory such as a hard disk (HD) 111, flexible disk (FD), or the like which stores a boot program, various applications, font data, a user file, and the like. A PRTC 108 controls signal exchange between itself and a printer engine unit 112 which is connected to itself and forms and outputs an image on a medium. An NC 113 is connected to a network and performs a process of controlling communication between itself and other devices connected to the network. Although, in this embodiment, functions described below of the image processing apparatus 100 are assumed to be carried out by software, each of the functions may be carried out by dedicated hardware provided in the image processing apparatus 100. Note that the CPU 101 of this embodiment is assumed to be a multi-core CPU. The image processing apparatus 100 may have a plurality of CPUs. In this example, the CPU 101 is assumed to be a multi-CPU unit 900 having a configuration shown in FIG. 9. The multi-CPU unit 900 includes two multi-core CPUs each having four processor cores.

In this example, the image processing apparatus 100 may be a portion of an image forming apparatus which is a unit for providing an image signal to an engine unit of a printer, MFP, or the like. Alternatively, the image processing apparatus 100 may be a separate general-purpose computer. In the latter case, the printer engine unit 112 is a printer apparatus (including a digital multifunction machine, etc.) connected to the computer. In the example of this embodiment, the image processing apparatus 100 analyzes PDL data which specifies an object(s) and an arrangement of the objects in each page to generate bit map data (also referred to as raster image data or simply referred to as image data) whose unit is a pixel. Rendering is the process of generating the dot data. A RIP or renderer is software or hardware which performs rendering, or a combination thereof. For example, if the printer engine is of electrophotography, rendered image data is subjected to pulse width-modulation for each color component, and the resultant image signals are input to the printer engine for image formation. In this embodiment, the rendering process will now be described, assuming that known techniques are used to convert PDL data into intermediate codes, converting generated dot data into an image signal, and the like.

The renderer of this embodiment, which has a parallel processing arrangement, allocates a processing unit (thread) to each object such as characters, line arts, graphics, or the like. A thread, which is a single processing unit, is performed by a single processor core in this example. Objects are arranged in a page (at absolute coordinate points). Each object is mapped to a separate relative coordinate system (e.g., converted into a relative coordinate system whose origin is located at the upper left point of a circumscribed rectangle of a graphic). An edge extraction process can be performed in each object region.

[Configuration and Procedure of Edge Extraction Process]

Figure 2:
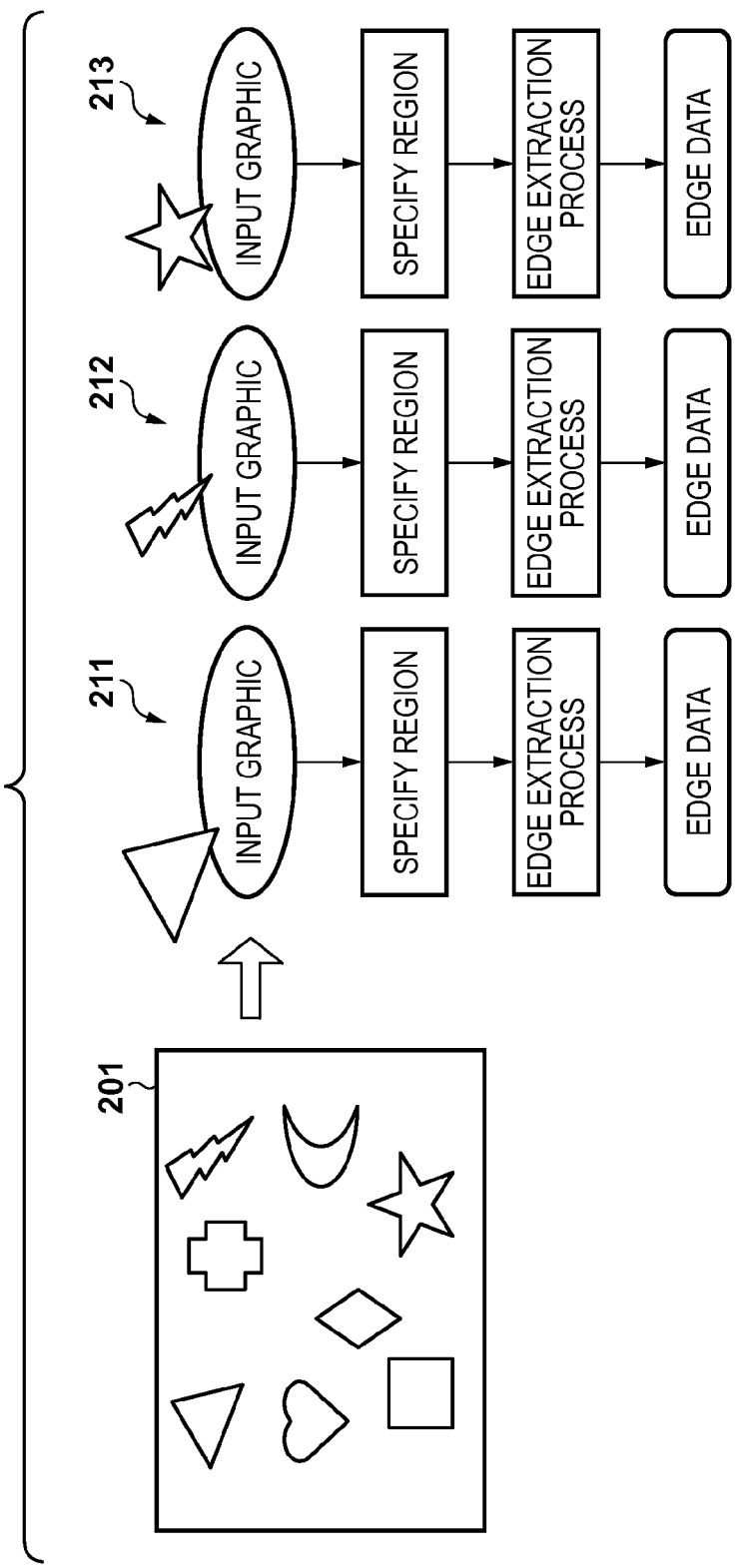
FIG. 2 is a conceptual diagram showing a case where an edge extraction process is separately applied to each graphic in the present invention.

FIG. 2 is a conceptual diagram showing a case where the edge extraction process is separately applied to each object. FIG. 2 shows how the edge extraction process is performed on each object in a page 201. Edge information extracted by threads 211-213 of the edge extraction process from respective objects is mapped back to coordinate points in the page, and is subjected to a synthesis process. The processes are not dependent on each other, and therefore, can be separately performed. In other words, after object data is input, a thread can be allocated to each of the edge extraction processes on the objects and the process (data synthesis) of merging data obtained by the extraction processes. The thread processes are mapped to the respective units (CPU cores) which perform the thread processes, and the cores perform the respective processes in a time-independent manner, and therefore, can operate in parallel. Note that the merging process is applied to objects for which edge extraction has been completed. For example, one thread (i.e., a core) is allocated to the merging process, and another thread is allocated to edge extraction. The number of cores is limited. Therefore, after having completed the edge extraction process on one object, the core performs the edge extraction process on the next object. An object for which edge extraction has been completed is to be subjected to the merging process. The extracted edges are arranged back in the page by merging. The process of allocating a thread to a core may, for example, be performed by a core which performs the merging process. From the merged data after edge extraction, bit map data is generated in which a space between edges is filled with pixels for each raster line by rasterization.

The renderer of this embodiment has a core management arrangement which determines allocation of a core based on the result of analysis of each data (e.g., PDL-related information), and performs parallel processing based on control. If there are a large number of available cores in the system, PDL-related information which is basic information of each object is extracted in a portion of the process of receiving PDL data in order to further improve the processing efficiency. PDL-related information includes the type, number, and the like of objects. The renderer is configured to map a process such as vectorization or the like to a downstream pipeline process in order to perform data processing in a distributed manner. Therefore, even if the number of cores is increased, the performance is improved in a scalable manner. Note that vectorization is the process of converting a curved line around a contour or the like of an object into straight lines prior to the edge extraction process. In the rendering system of this embodiment, vectorization is not the process of processing objects in order in which the objects are received. Instead, for example, objects which have been determined to require vectorization are temporarily buffered, and each object is subjected to vectorization by a separate thread (i.e., a separate core), i.e., vectorization is also performed in parallel. The vectorized objects are stored for the subsequent edge extraction process. Vectorization may be performed in parallel with edge extraction. This allows an object which does not require vectorization to be immediately subjected to the edge extraction process.

Figure 3:
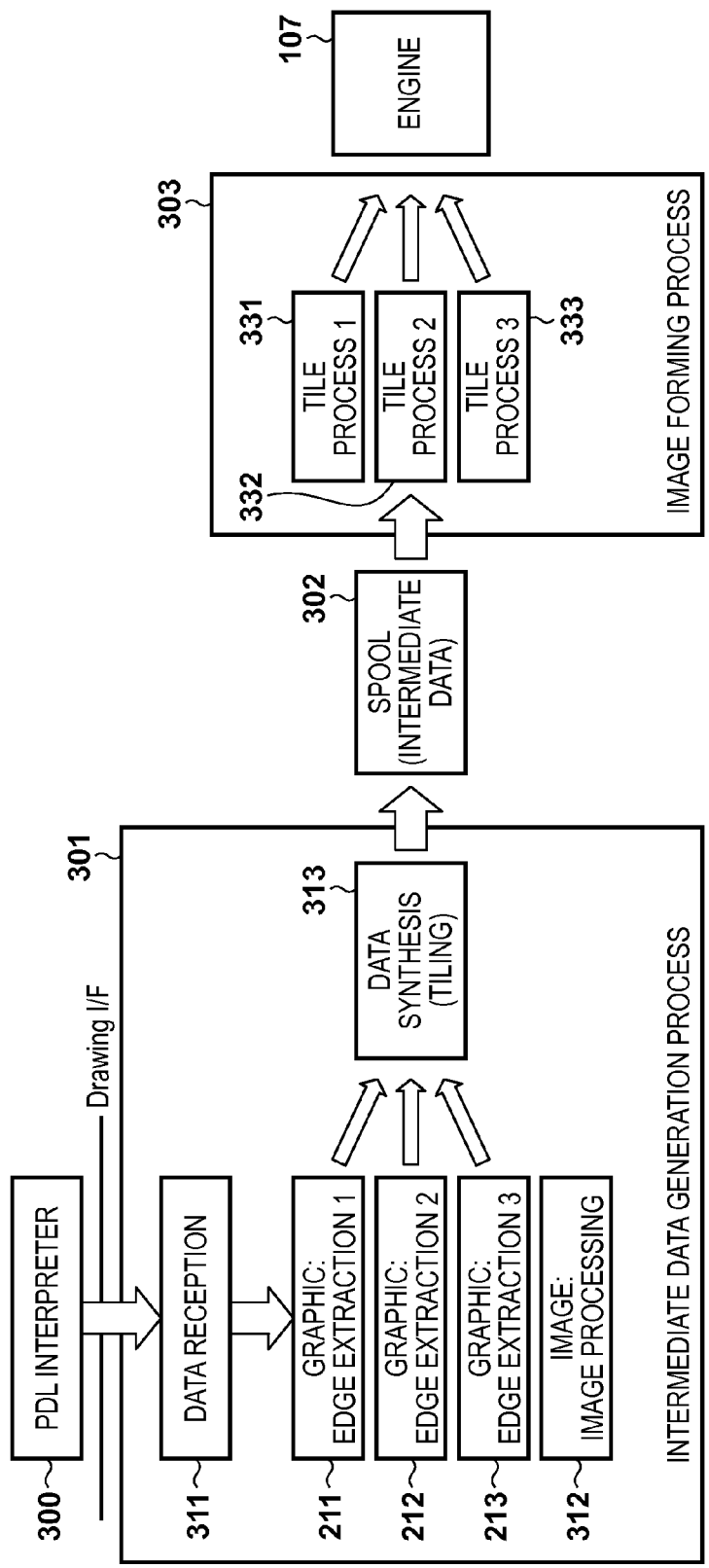
FIG. 3 is a diagram of a basic system configuration of a first embodiment of the present invention.

FIG. 3 is a diagram for outlining a rendering system (RIP system), showing a basic configuration of this embodiment. The rendering system includes an intermediate data generation process unit 301, a spooler 302, and an image forming process unit 303. As shown in FIG. 3, PDL data is transferred from a PDL interpreter 300 through an image generation interface to the RIP system (i.e., a renderer) 301. In the RIP system 301, a "data reception" process block 311 receives a PDL object, such as a graphic, character, image, or the like, and stores the data in an internal spooler (not shown) as appropriate, and thereafter, transfers the data to a downstream process unit. If the PDL object is a graphic or the like, the data of the graphical object is transferred to the edge extraction processes (threads) 211-213. On the other hand, if the PDL object is an image, the data is transferred to an image process (thread) 312. Although the above vectorization is performed when necessary, this will not be herein described. Each of these threads is performed by one processor core assigned to the thread. If there are a plurality of objects in one page, a separate edge extraction process thread is allocated to each object. Note that the maximum number of objects processed in parallel is the number of processor cores. The objects are subjected to the downstream separate threads 211-213 of the edge extraction process. Each thread is processed by a process unit (processor core) assigned to the thread. Therefore, the data reception process block 311 is configured to transfer data of objects scheduled for the edge extraction process performed by the respective process units. Although one core can process a plurality of threads in a time-division manner, it is assumed that each process is performed by a corresponding core for at least the edge extraction process in this example. Note that the edge extraction process, and other processes such as analysis of PDL data and the like, may be processed by one core in a time-division manner.

Edge data extracted by each edge extraction process is transferred to a downstream data synthesis process (thread) 313 as appropriate, in which synthesis (superimposition process) is performed in a page, and at the same time, data is converted into a tile-like format, and the resultant data is written as RIP intermediate data to the spooler 302. The RIP intermediate data in the tile-like format is further processed by a subsequent image forming process 303 in which the tiles are processed by tile processes (threads) 331-333 to be converted into pixel data. The tiles are processed separately in time. The tiles are joined together into, for example, a band, which is provided as a raster signal to the engine unit 112.

FIG. 4 shows how the edge extraction process is performed on a graphic which is a triangle. An intersection between a contour of an object and a scan line is extracted as an edge. In FIG. 4, an arrow indicating the rightward horizontal direction is a scan line. A circumscribed rectangle around the triangle is scanned successively from the upper left corner to the lower right corner. In FIG. 4, the third line is being scanned to extract edges (two edges) on sides AB and AC.

Figure 5:
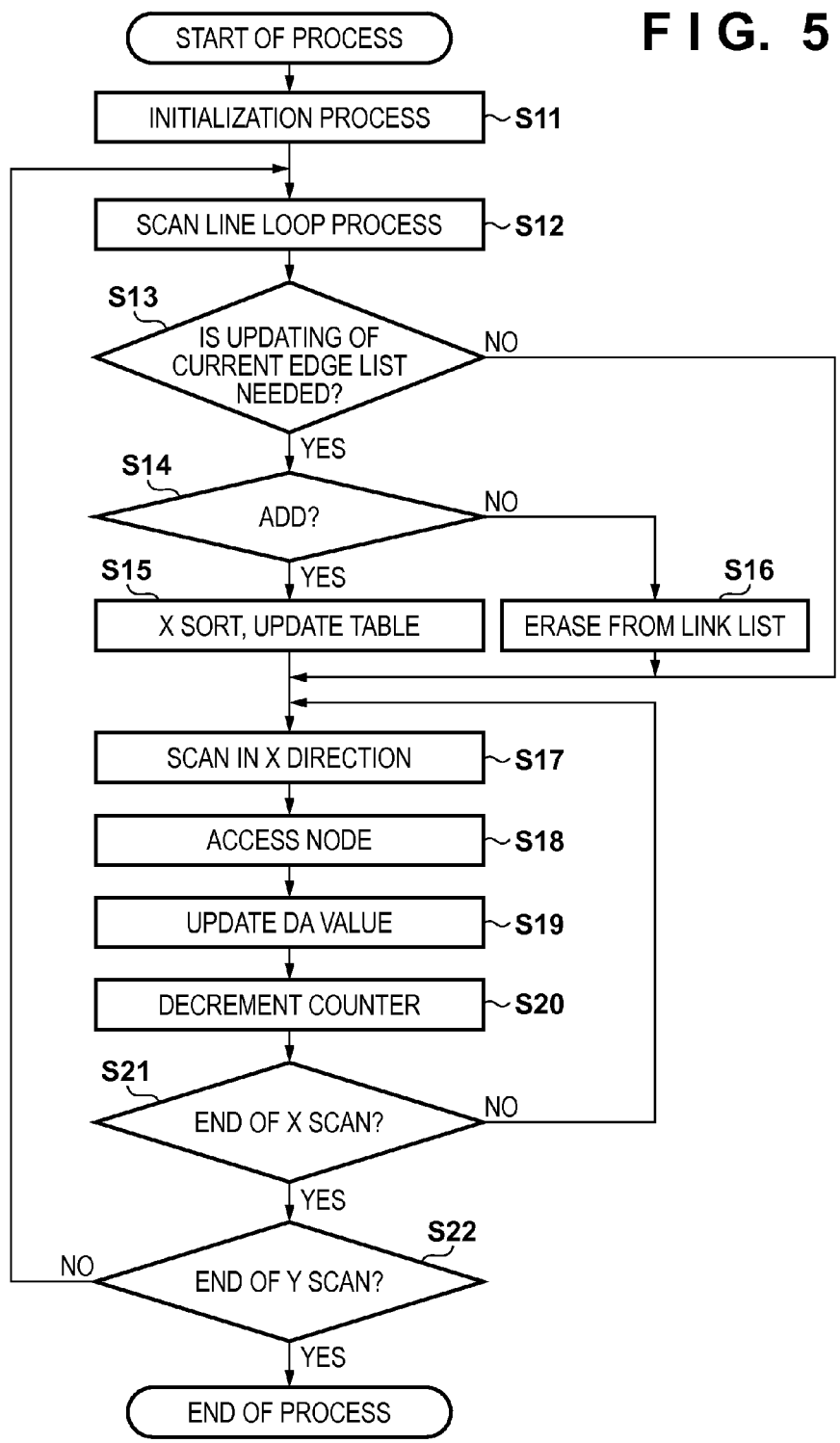
FIG. 5 is a flowchart schematically showing a flow of an edge extraction process used in the first embodiment of the present invention.

FIG. 5 is a flowchart which outlines each thread of the edge extraction process. The process of FIG. 5 is performed by each processor core provided in the CPU 101. Initially, in step S11, an initialization process is performed based on input graphic data. In this process, a scan range and the like are determined, and parameters such as the number of loops and the like are set for execution of subsequent processes. The edge extraction process is performed using a relative coordinate system for each object. Therefore, the parameters include, for example, the number of lines included in a rectangular region (a rectangular region whose sides are parallel with the sides of an original page) containing an object, the number of dots in each line, and the like. Next, in step S12, a loop process begins with the uppermost scan line, and proceeds in the Y direction (the sub-scanning direction of raster scan) for each line. A scan line being processed is referred to as a current scan line or a scan line of interest.

In step S13, data of an object such as a graphic or the like on a current scan line (data of a segment of a contour of the object) is extracted, and it is determined whether or not edge information (a current edge data list) on the scan line needs to be updated. If the determination result is negative, control proceeds to step S17. Otherwise, control proceeds to step S14. In step S14, it is determined whether an edge is to be added to or deleted from the current edge data list. If an edge is to be added (e.g., the scan line intersects a contour of a graphic, etc.), data to be added in step S15 is added in ascending order in the X direction. Here, added data is referred to as a node, and nodes are linked together in the list. On the other hand, if edge data is to be deleted (e.g., the scan line does not intersect a contour of an object, etc.), control proceeds to step S16, in which the data is deleted from the edge data list.

In step S17, a loop process for extracting edge information on the current scan line in the X direction begins. In step S18, the nodes in the edge data list are successively accessed. The edge information is configured so that a data value (DA) on the current scan line (Y value) is updated based on information such as the slope of a line segment or the like. The data is updated in step S19. Step S20 is a process of decrementing the counter for an X loop. In step S21, it is determined whether or not an X-direction loop is ended. Specifically, for example, if the edge extraction process has been completed for all contour lines intersecting a scan line of interest of a rectangular region containing an object to be processed, an X-direction process loop for the scan line of interest is determined to be ended. While steps S17-S21 are for an X-direction loop, steps S12-S22 are for a Y-direction loop, which is repeated for each scan line of interest in sequence. The two loops are performed to extract contour information (edge information) of a two-dimensional graphic. As a result of the procedure, for example, a list of coordinates and colors of points where a scan line intersects a contour of an object is extracted for each scan line. Specifically, this process is interpolation between two points which is carried out by the DDA algorithm or the like so that coordinates and colors indicating a contour of an object are obtained. Note that the color may be the color of an entire object rather than the color of a coordinate point.

Figure 6:
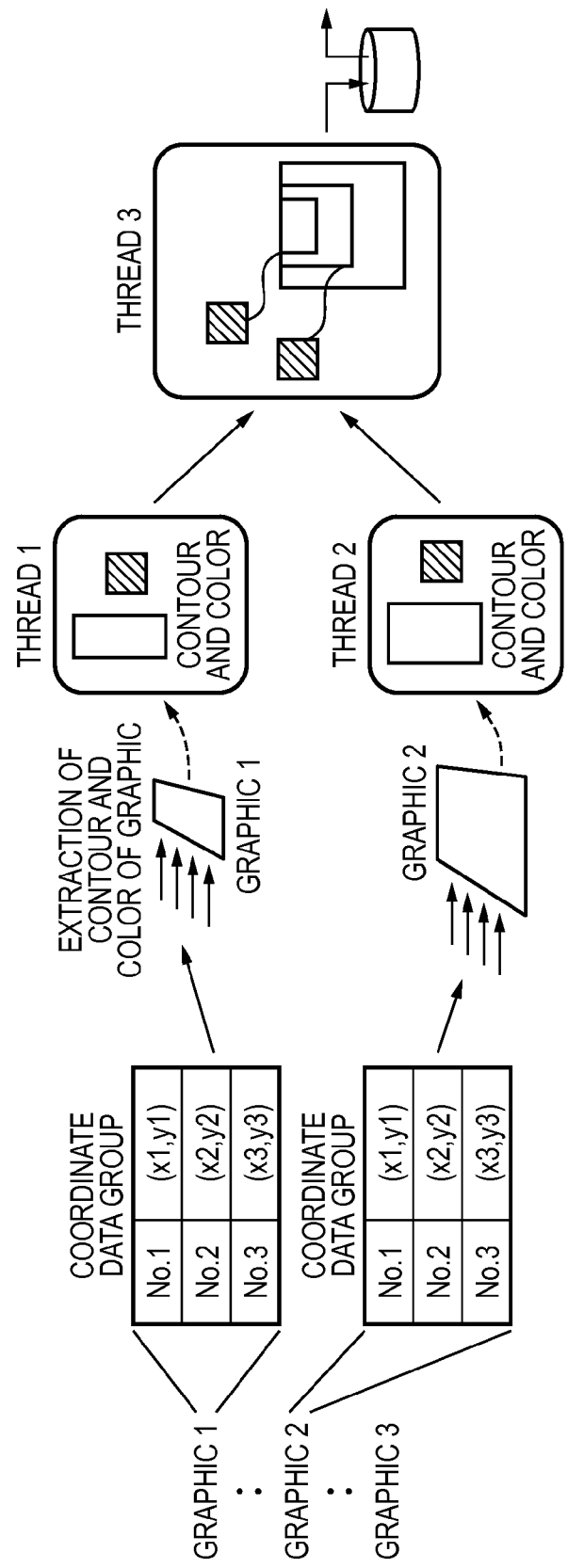
FIG. 6 is a conceptual diagram showing how an edge extraction process is performed on graphics in parallel.

FIG. 6 is a schematic diagram for outlining a flow of data in the "edge extraction process" and the "data synthesis process" which merges data of extracted edges, of the processes of FIG. 3 (a diagram for outlining the basic system). As shown in FIG. 6, specifically, data of each of graphics 1 and 2 includes graphic identification information for identifying the graphic, and a group of coordinate data forming the graphic. From the data, edge data is extracted using the "edge extraction process," i.e., the process flow of FIG. 5 described above. The graphics 1 and 2 are processed using different threads separately, and therefore, two sets of edge data of the graphics are simultaneously extracted. These processes are represented by a thread 1 and a thread 2 in FIG. 5. During the course of these processes, paint information of the contour of a graphic is simultaneously extracted by a color information extraction process (not shown). A thread 3 is used to perform a "data synthesis" process based on edge data and color information extracted using the threads 1 and 2. For example, if the graphic 2 is painted with monochromatic red (opaque), the graphic 1 is painted with monochromatic blue (opaque), and the graphic 1 is drawn above the graphic 2, a portion where the graphics 1 and 2 overlap is painted with blue which is the color of the upper layer. In this case, two pieces of color information (i.e., blue and red) are stored. On the other hand, in a region where is processed using the thread 3 (a rectangular tile in the example of FIG. 5), edge data synthesis is performed in the region of the graphics 1 and 2 (e.g., an edge which is no longer required due to the overlapping is erased). In this proposed process scheme, the number of pieces of color information which should be stored for the region may increase, depending on how the graphics 1 and 2 overlap. For example, if the graphic 1 is painted with monochromatic red (opaque), the graphic 2 is painted with monochromatic blue (transparent), and the graphic 2 overlaps the graphic 1, the color of a region where the graphics 1 and 2 overlap is calculated by transparency synthesis calculation. For example, because blue and red are combined together to produce violet, color information about red, blue, and violet is stored in the process using the thread 3.

[Allocation Control of Processor Core]

Figure 7:
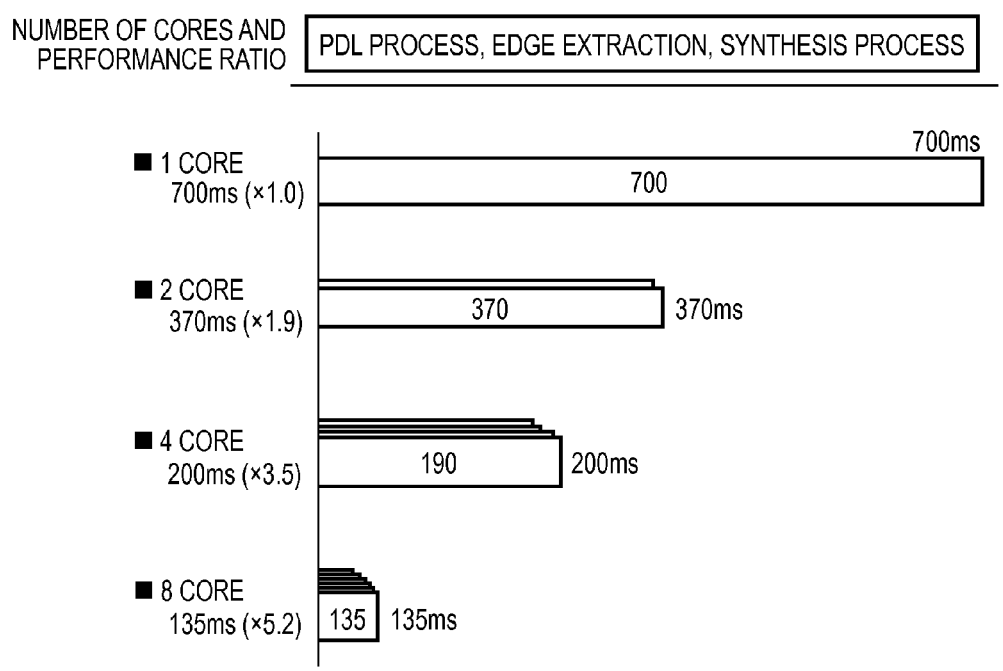
FIG. 7 is a diagram for outlining how a time of task is reduced when a plurality of cores are used.

FIG. 7 is a graph showing how the time of task varies as the number of CPU cores increases. In the example graph, in a system in which only one of the processor cores of a CPU is used, the time of task required for one page is a total of 700 ms. When this is similarly performed in a system in which two cores are used, the overall time of task can be reduced because a portion of the internal process can be performed in a pipeline scheme, or a main process (edge generation, etc.) can be performed in parallel (in a multiplexing manner). In this case, it takes 370 ms for the two cores to complete the process. Also, it takes 200 ms for four cores to complete the process. It takes a maximum of 135 ms for eight cores to complete the process. Eight cores complete the process 5.2 times as quickly as one core.

Figure 8:
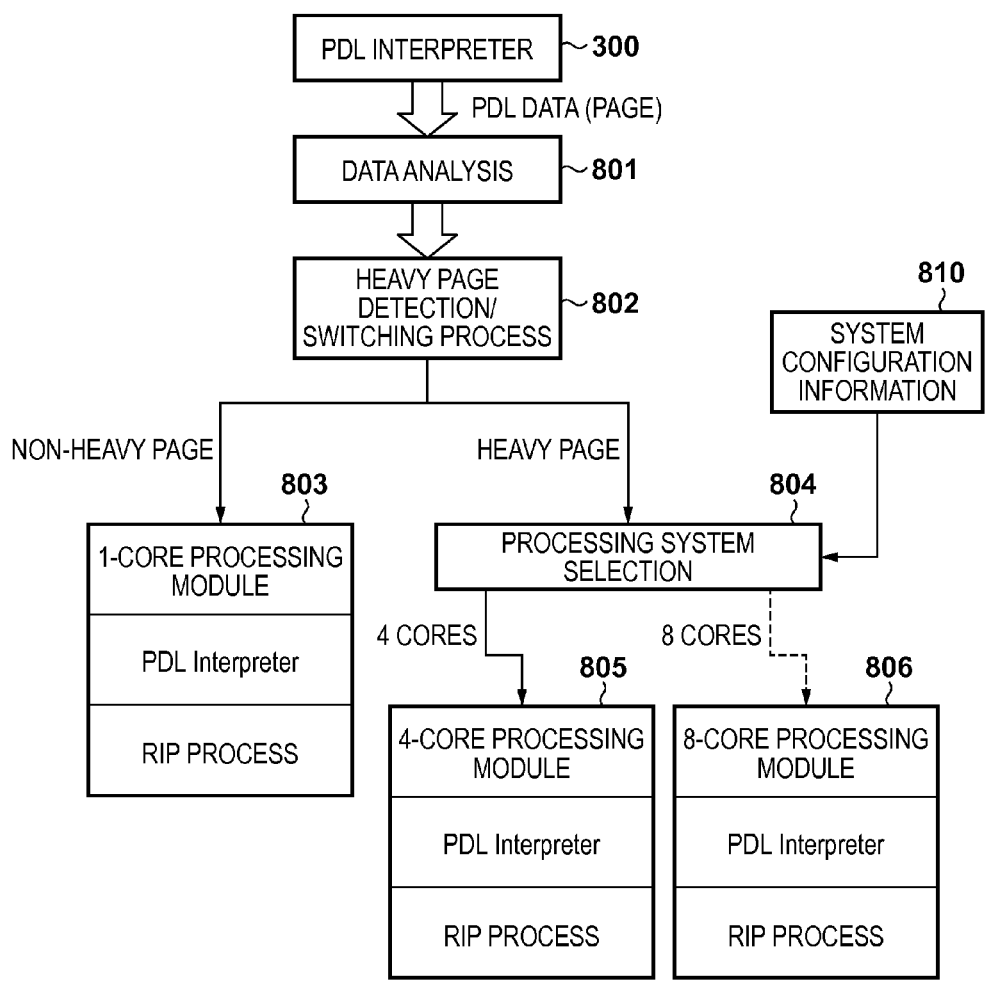
FIG. 8 is a diagram of a module configuration of a system for describing how modules are switched, depending on the number of cores.

FIG. 8 is a diagram for outlining the system of this example in which process flows are switched, depending on the number of cores. Processing modules 803, 805, and 806 of FIG. 8 correspond to the rendering system of FIG. 3. FIG. 8 shows a schematic representation. The physical configuration is the following. Three processing module printer engines are configured to transfer data at a rate within a predetermined range in order to keep the engine speed. Also, the processing modules use different numbers of cores in the edge extraction process.

In FIG. 8, a data analysis unit 801, when receiving PDL data from the PDL interpreter 300, extracts PDL-related information, and determines whether or not a page of interest is a high-load page having a high processing load (also referred to as a heavy page) or a low-load page (also referred to as a non-heavy page). Although one thread of this process is used for execution, one edge extraction process thread and a common core may be used for execution in a time-division manner, for example. The determination of whether the load is high or low is determined based on the number of objects contained in a page, for example. If the number of objects is greater than a threshold, it is determined that a page of interest is a high-load page. The threshold may vary depending on the processing performance of the processor, and may be empirically determined, for example. The load of vectorization may be taken into consideration in addition to the number of objects. The number of objects which require vectorization may be multiplied by a predetermined weight which exceeds one. Also, an object having some transparency requires a process such as alpha blending or the like during object synthesis, and therefore, the number of such objects may be further multiplied by a predetermined weight.

As a result of the above determination, a page of a normal print job (non-heavy page) is input to a one-core processing module block. In the block, a PDL analysis process and a RIP process are performed by one processor core. In this case, the processes may be serially performed, or alternatively, a plurality of threads may be processed by one core in a time-division manner.

On the other hand, when it is determined that a page to be processed is a heavy page, the RIP process is performed in parallel using a plurality of cores included in a multi-core CPU. At this time, required is information about the number of physical cores actually available in a hardware environment in which a program is executed. In FIG. 8, system configuration information provided by an operating system or the like is read from a system configuration information storage unit 810 and input to a block of a processing system selection unit 804 so that an appropriate process module is selected. In this embodiment, when the system has four physical processor cores, data of a page to be printed is input to a block of a four-core processing module. When the system has eight physical processor cores, data of a page to be printed is input to a block of an 8-core processing module. In the case of one core, data is input to a one-core processing module. Although not shown, in the case of two cores, data is input to a 2-core processing module. Although each processing module has the configuration of FIG. 3, the processing modules have different number of cores which perform a thread. Therefore, the configuration of FIG. 8 can be provided by controlling the number of cores used, by using the same configuration, instead of using physically different modules.

Next, a difference between each processing module will be described in greater detail. In the one-core processing module 803, one processor core is used in execution of the data analysis unit 801, a heavy page detection unit 802, and an edge extraction process unit. In this case, for example, a data analysis process, a heavy page detection process, and an edge extraction process are performed as separate threads by one core in a time-division manner. In this case, overhead due to multiple threads is desirably reduced to the extent possible by using a single thread for edge extraction.

In the four-core processing module 805, for example, one core may perform threads of data analysis, heavy page detection, and one edge extraction process, and the other three cores may be allocated to edge extraction processes. Alternatively, one core is used for data analysis and heavy page detection, and the other three cores may be allocated to edge extraction processes. The vectorization process is performed by any of the cores in a time-division manner when necessary. The data synthesis process is also performed by any of the cores in a time-division manner.

In the 8-core processing module 806, eight cores are divided into two groups each including four cores. The PDL data of one page is divided into two, one of which is processed by one of the core groups, and the other of which is processed by the other core group. The data analysis process, the heavy page detection process, and the vectorization process are performed by any of the cores in a time-division manner. Specifically, in the case of a system including eight processor cores, the processor cores are divided into two groups, to which two regions included in one page are assigned so that each region is processed by the corresponding group. In the region division, for example, one page may be simply divided into two halves along the main scanning direction. Alternatively, one page may be divided into several bands (desirably, an even number of bands), even-numbered bands may be grouped as one region while odd-numbered bands may be grouped as the other region, and the regions may be processed by the respective corresponding core groups.

Note that the RIP process as described above may include the tile process performed by the image forming process unit 303, or may be the processes performed by the intermediate data generation process unit 301, i.e., the processes including edge extraction to data synthesis. In the former case, the tile process of the image system process unit 303 may be performed by the same processor core that provides the intermediate data generation process unit 301. Specifically, for example, when one page is divided into two regions, to which different cores are allocated, the processes including the edge extraction process to the tile process may be performed by the same core.

Note that if an operating system is configured so that different processor cores are allocated for different threads, the maximum number of threads of the edge extraction process may be set to be equal to the number of cores in order to allocate a different core to each thread. Therefore, in this case, if the number of cores is eight, a maximum of four threads of the edge extraction process may be performed for each division region.

Figure 9:
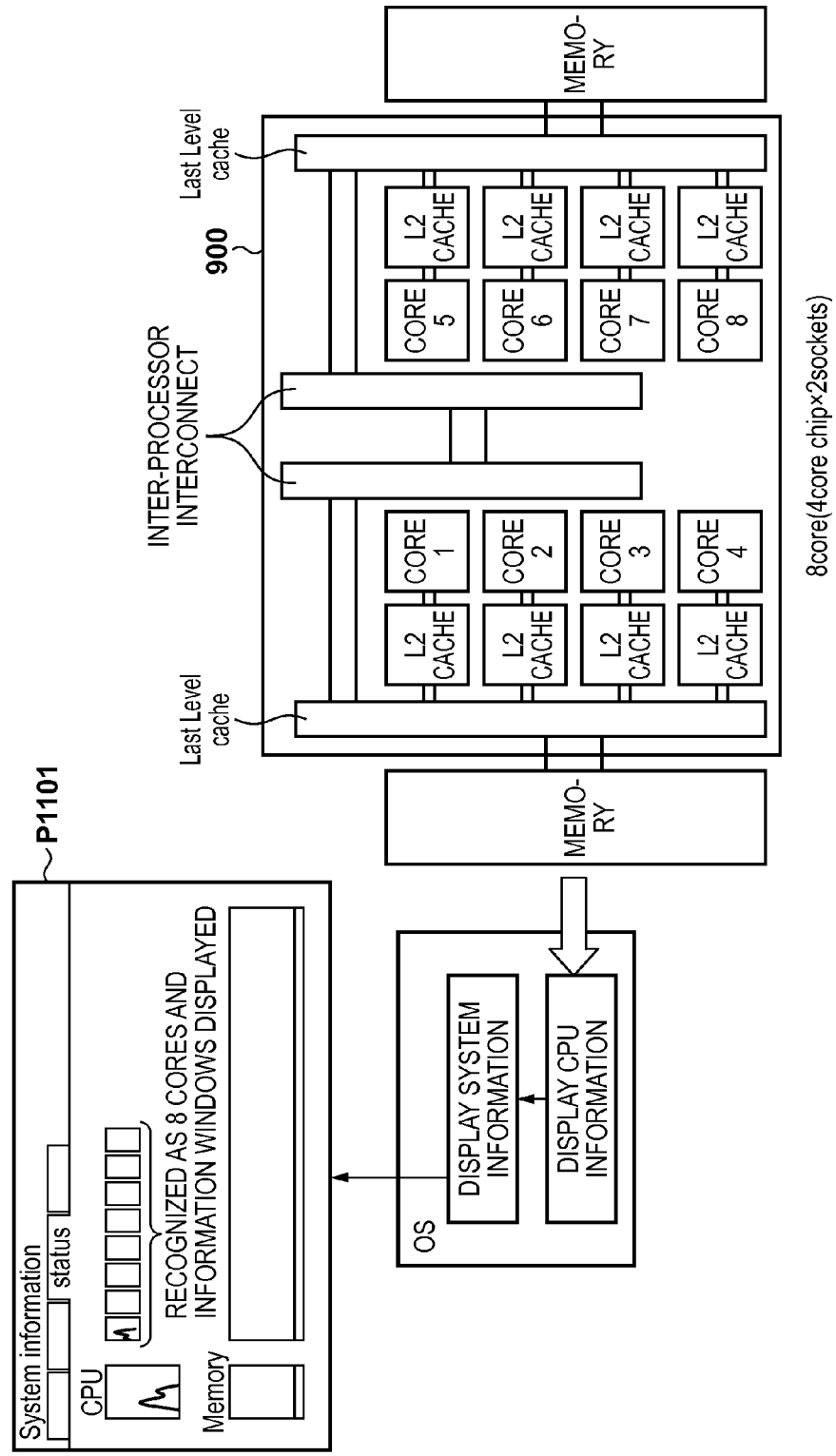
FIG. 9 is a conceptual diagram showing how CPU information stored in an OS is displayed as system information on an UI.

FIG. 9 is a diagram for outlining a situation that an OS stores hardware information in order to obtain system information as described above. In FIG. 9, a block P1101 indicates system information displayed by a system OS, that is the current load of a CPU, the usage of a memory, and the like. The OS obtains hardware information (the hardware information is based on information set for the BIOS) during activation, and therefore, recognizes what kind of CPU the OS itself is operated by. The hardware information is stored as system information in the OS. Therefore, information about the number of cores available for the system is obtained by inquiring it of the CPU of the OS.

FIG. 10 is a graph for describing a difference in time of task in a case where eight cores are allocated to the process of one page. Conventional wisdom generally suggests that the number of units (cores) which perform a process is invariable no matter how many cores are allocated to any data in any region, and therefore, there is not a difference in eventual speed. However, the present inventors' study has demonstrated that when one page is divided into upper and lower regions, to each of which four cores are allocated as shown in FIG. 10, the process is completed more quickly than when eight cores are allocated to the entirety of one page. The CPU, when processing data, accesses data in a main memory, and reads data through a bus or cache instead of reading data directly from the memory. In the case of an actual CPU configuration, even if it has eight cores as shown in the CPU configuration diagram of FIG. 9, paths for accessing required data do not have equal distances. Unless, based on this, a core allocation pattern is optimized, the processing speed of a program in a system including a multi-core CPU cannot be maximized. As shown in FIG. 10, although it takes 1050 ms when an entire heavy page containing a large number of graphical images is processed by an 8-core CPU, it takes 900 ms to complete the process when the heavy region is divided into two regions, to each of which four cores are allocated as shown in the lower portion of FIG. 10, i.e., the speed can be increased by about 14.3%.

When, as described above, rendering is performed on a heavy page having a high rendering processing load using a rendering system (i.e., an image processing apparatus) employing a multi-core CPU having eight processor cores, a page is divided into two regions, in each of which processes such as edge extraction and the like are performed using four cores. As a result, the core utilization rate can be improved, and therefore, the rendering process can be completed more quickly.

Although, in this embodiment, the number of cores allocated to the edge extraction process is changed, depending on whether or not a page of interest is a heavy page, a plurality of processor cores may be unconditionally allocated to the edge extraction process like a heavy page. In other words, the heavy page detection unit 802 and one-core processing module of FIG. 8 are not provided, and a core(s) is allocated to a thread, depending on the number of cores.

Alternatively, even when the number of cores exceeds eight, a page may be similarly divided into two regions, cores may be divided into two groups, and rendering processes such as the edge extraction process may be performed on an object included in each region. Still alternatively, for example, cores are divided into groups so that the number of cores for processing one region is a predetermined number, such as four, and a page is divided into the same number of regions as there are groups, and the rendering process may be performed on each division region using a corresponding one of the core groups.

Second Embodiment

Figure 11:
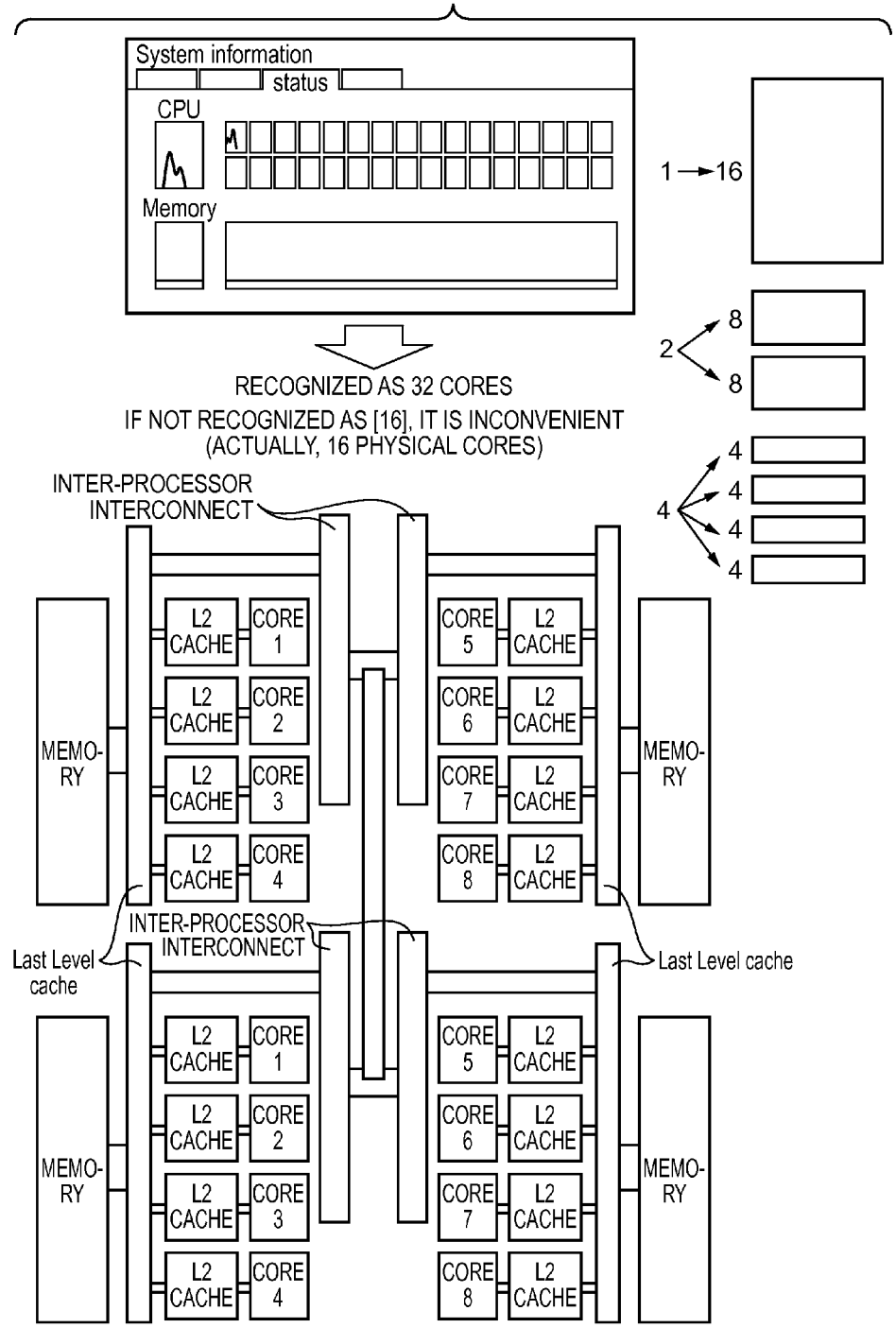
FIG. 11 is a diagram for outlining a system including 32 logical cores assumed in a second embodiment of the present invention.

FIG. 11 is a diagram for outlining a system configuration (hardware information used by a RIP server) according to a second embodiment. Here, system information is obtained by using hardware information stored in an OS. This system has a multi-CPU configuration including four 4-core processors. Therefore, there are a total of 16 cores. However, as shown in FIG. 11, there is a system in which the number of actual physical cores is different from the number of logical cores recognized by the operating system. While the system recognizes that the number of CPU cores is 32, only four 4-core CPUs are provided on the actual board, i.e., the number of actual physical cores is 16. This is achieved by a technique of virtually providing two cores (logical cores) by utilizing an idle time of a register or pipeline using a plurality of decoders and the like, although one core provides calculation resources corresponding to one core. Since one core includes a single calculation circuit, two threads cannot be processed fully in parallel by two logical cores.

In this situation, even if the allocation of cores is optimized in a manner similar to that of the first embodiment with reference to information indicating that there are 32 cores, that is provided from the operating system, the processing speed may not be improved. Therefore, in this embodiment, instead of directly using system information provided from the OS, the user provides configuration information of a CPU using an UI.

Figure 12:
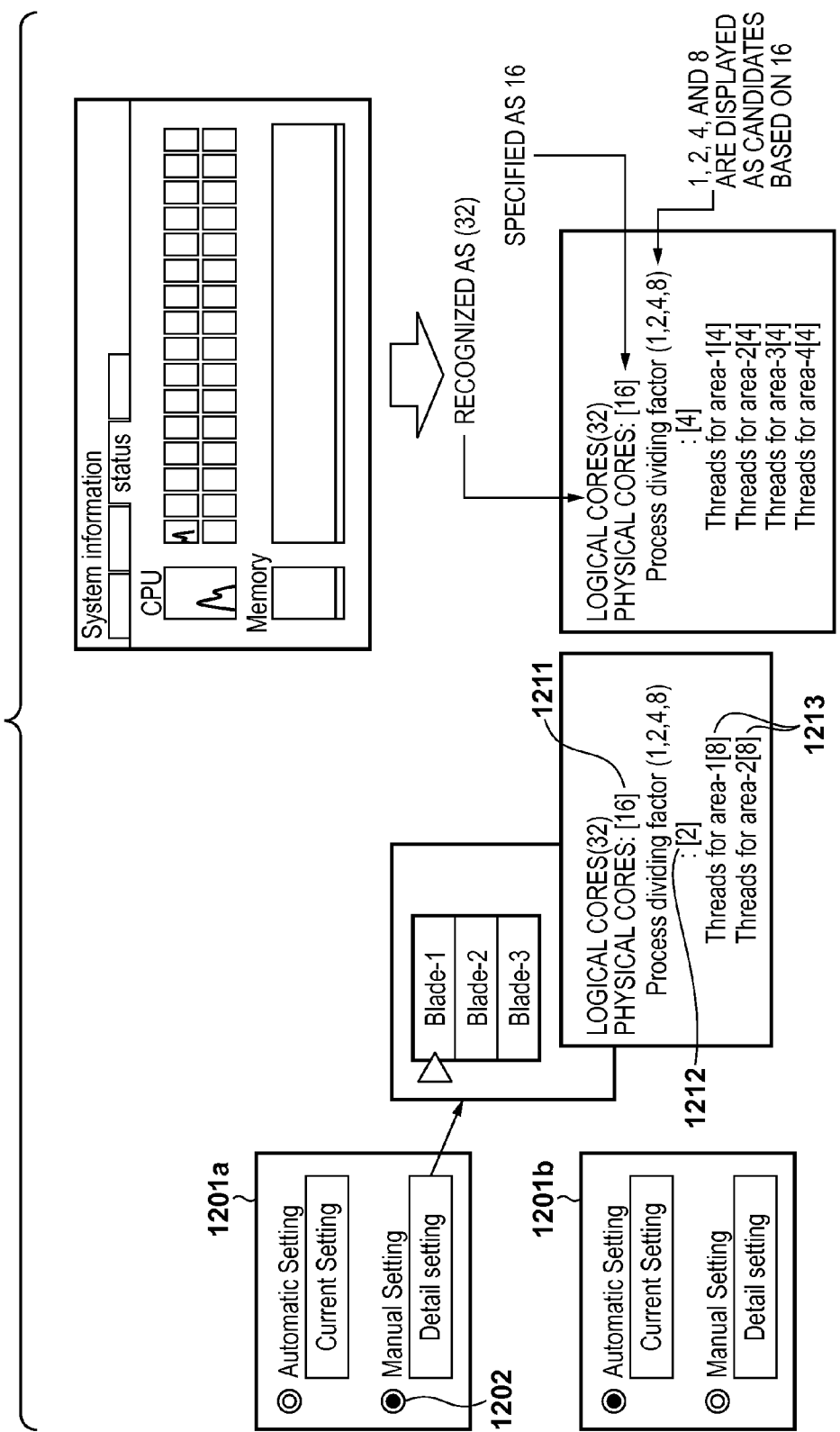
FIG. 12 is a diagram showing an UI screen for setting system information (the number of cores, etc.) in the second embodiment of the present invention.

FIG. 12 is a diagram for outlining the UI for providing the CPU configuration information. The system is configured to recognize a difference between a logical core and a physical core using a previously prepared program (the processing system selection unit 804 of FIG. 8). In a window 1201*b*, an automatic setting button has been selected. In this case, for example, the process described in the first embodiment is performed based on the number of processor cores recognized by the operating system. In addition, in this embodiment, a manual setting button is provided to allow the user to directly specify. The manual setting button 1202 is provided in a user interface unit 1201 of the image processing apparatus. The UI screen is activated from general setting of RIP software (not shown), on which the setting can be made. In a window 1201*a* shown in the example of FIG. 12, the manual setting button has been selected. When detail setting is selected, a numeral for physical cores can be manually input. The numeral "32" for "logical cores" indicates the number of cores recognized by the OS, and the number of physical cores can be specified by the user. Here, a value of 16 has been input to a number-of-cores setting field 1211. In addition, in the detail setting UI, a numberof-regions input field 1212 and a number-of-threads input field 1213 are provided to input the number of regions to which a page is to be divided for a heavy page and the number of threads allocated to each region. The number of threads may be a default value which is a quotient obtained by dividing the specified number of cores by the specified number of regions. Similar operations are performed in the first embodiment and this embodiment, except that the number of cores and the number of division regions can be specified in this embodiment. Specifically, the processing system selection unit 804 of FIG. 8 selects a processing system including eight cores in the first embodiment, for example. In this embodiment, the number of cores is specified. Also, although the number of regions to which one page is divided is two in the first embodiment, the number of regions is specified in this embodiment.

Figure 13:
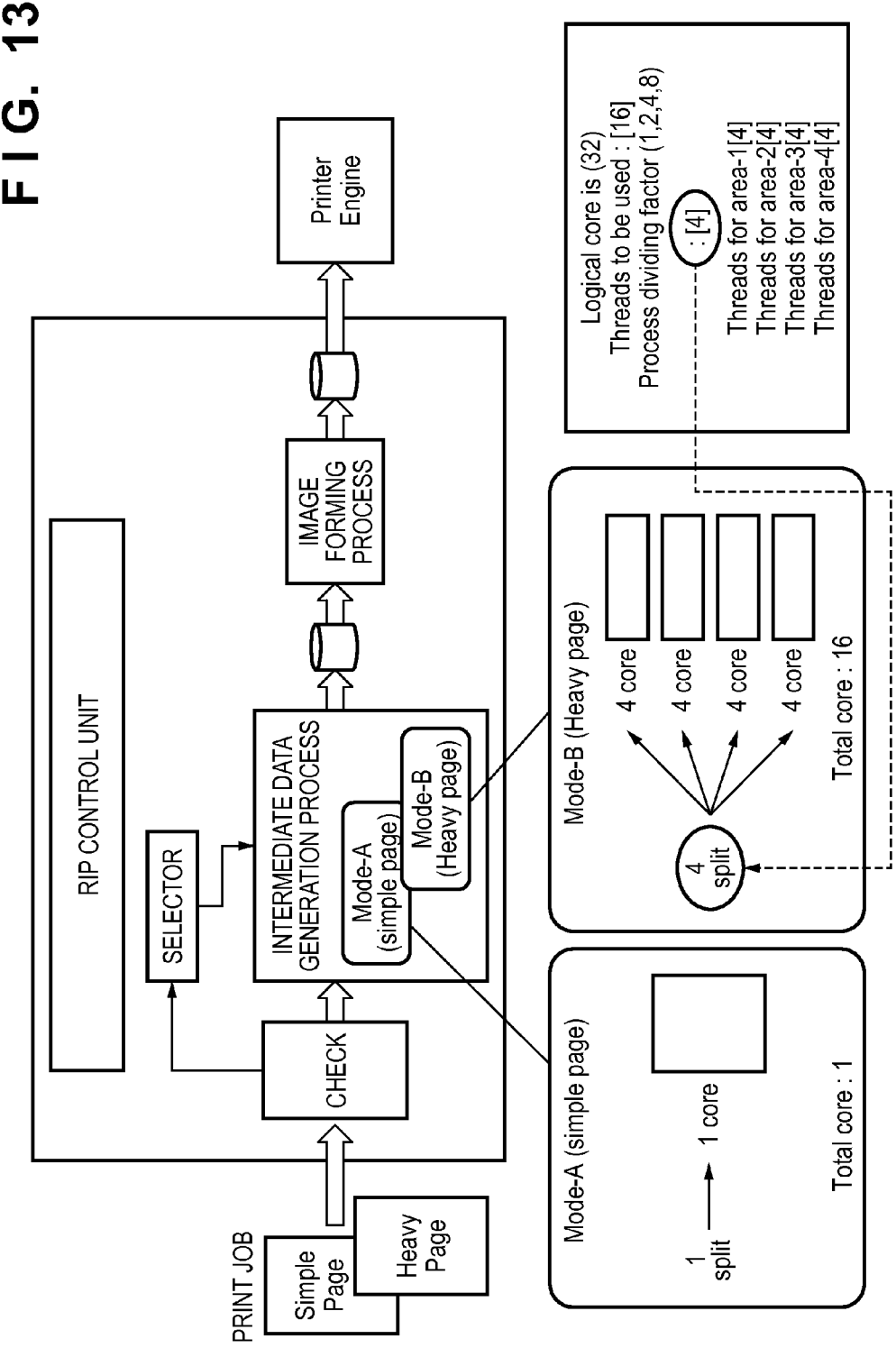
FIG. 13 is a diagram of a basic system configuration of the second embodiment of the present invention.

FIG. 13 is a schematic block diagram of a print system of the second embodiment. The UI 1201 of FIG. 10 is used to specify 16 physical cores in a system which provides 32 logical cores, and if a page is a heavy page, the page is divided into four regions, to each of which four cores are allocated, for example. As a result, when a print job is input to a print system, a page is initially checked by a checking block. Here, it is determined whether or not the page is a heavy page. If the page is not a heavy page (such a page is referred to as a simple page for the sake of convenience), the intermediate data generation process unit operates in an operation mode A. If the page is a heavy page, the intermediate data generation process unit operates in an operation mode B. In the process of the mode A, the entirety of one page is processed using one core. On the other hand, in the process of the mode B, a page is divided into four regions, and four cores are allocated to the respective corresponding ones of the four regions. Although, in this embodiment, the process of the mode A is performed using one core, the process of the mode A may be performed using a smaller number of cores than the number of cores (e.g., four) allocated to one region in the process of the mode B.

Note that if the number of threads is smaller than the number of physical cores, the operating system may be controlled so that two logical cores sharing the same physical core are not used, for example. Otherwise, all cores to be used need to be designated as separate physical cores. In this case, it is necessary to designate cores using identifiers or the like for the cores, in addition to the number of cores.

As described above, the rendering process can be performed quickly by performing threads using physical cores which can actually perform parallel processing.

Also, the number of processor cores is known during manufacture of a rendering system, and is invariable during use of the system. Therefore, the number of physical cores may be previously recorded in a ROM or the like without allowing the user to specify the number of physical cores using a user interface. In this case, the processing system selection unit 804 accesses the ROM to find the number of physical cores.

Other Embodiments

Although, in the foregoing, the number of cores is assumed to be 8, 16, 32, and the like, the number of cores in a CPU is, of course, not limited. The number of cores may be 6, 12, 24, and the like. If the number of cores is increased, the time required by the intermediate data process unit may be reduced. Although equal numbers of cores are allocated in this example, unequal numbers of cores may be allocated in some cases. The number of cores may not be invariable, and may be dynamically changed based on the determination of a state of the system, whereby the efficiency may be further improved.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-103651, filed May 19, 2014, which is hereby incorporated by reference herein in its entirety.

What is claimed is:

1. An image processing apparatus including a multi-core CPU and capable of performing a process using multiple threads, comprising:
 a memory storing a program which causes, when executed by the multi-core CPU, the image processing apparatus to:
 perform an edge extraction process using a thread performed by a separate processor core for each PDL object contained in a page;
 synthesize edge information extracted from the PDL objects; and
 generate raster image data of the page based on the synthesized edge information,
 wherein
 the edge extraction
 divides the page into at least two regions each of which contains a plurality of PDL objects;
 allocates each of different groups each including processor cores included in the multi-core CPU to each of the at least two regions; and
 executes, using threads executed by processor cores of one group which is allocated to one region of the at least two regions, the edge extraction process for the PDL objects contained in the one region, and executes, using threads executed by processor cores of another group which is allocated to another region of the at least two regions, the edge extraction process for the PDL objects contained in the other region.

2. The image processing apparatus according to claim 1, wherein
the edge extraction determines whether or not a page to be processed is a high-load page having a high processing load, and
wherein,
when it is determined that the PDL data to be processed is the high-load page, the page is divided into two or more regions, each of the different groups each including a predetermined number of different processor cores are allocated to each of the two or more regions, and, as threads that are executed by the allocated predetermined number of processor cores of the allocated group, the edge extraction process is executed for the PDL objects contained in each region, and
when the it is determined that the PDL data to be processed is not the high-load page, a group including a number of processor cores that is smaller than the predetermined number is allocated to the page without dividing the page, and, using a thread or threads executed by the number of processor core or cores of the group which is allocated to the page, the edge extraction process is executed for the PDL objects contained in the page.

3. The image processing apparatus according to claim 1, wherein
when the number of processor cores included in the multi-core CPU is eight,
the page is divided into two regions,
each of the different groups each including four different processor cores included in the multi-core CPU is allocated to each of the two regions,
using threads executed by the four processor cores of the one group which is allocated to one region of the two regions, the edge extraction process is executed for the PDL data contained in the one region of the two regions, using threads executed by the four processor cores of the another group which is allocated to another region of the two regions, the edge extraction process is executed for the PDL data contained in the other region of the two regions.

4. The image processing apparatus according to claim 1, the program further causing the image processing apparatus to:
specify the number of processor cores included in one group to be allocated,
wherein
each of the different groups each including the specified number of different processor cores are allocated to each of the divided regions, and, using a thread or threads executed by the number of processor cores of the group which is allocated, the edge extraction process is executed for the PDL objects contained in each region.

5. The image processing apparatus according to claim 4, the program further causing the image processing apparatus to:
specify the number of regions obtained by dividing one page,
wherein
the page is divided into the specified number of regions.

6. The image processing apparatus according to claim 1, wherein
the object is a graphical object.

7. The image processing apparatus according to claim 1, wherein
the obtained synthesized edge information is stored as tiles obtained by dividing a page, raster image data is generated for each tile.

8. The image processing apparatus according to claim 1, the program further causing the image processing apparatus to:
form and output the generated raster image data as an image, on a medium.

9. An image processing method performed by an image processing apparatus including a multi-core CPU and capable of performing a process using multiple threads, comprising:
performing an edge extraction process as a thread performed by a separate processor core for each object contained in a page;
synthesizing edge information extracted from the PDL objects; and
generating raster image data of the page based on the synthesized edge information obtained by the synthesizing,
wherein
the performing an edge extraction process comprises:
dividing the page into at least two regions each of which contains a plurality of PDL objects;
allocating each of different groups each including processor cores included in the multi-core CPU to each of the at least two regions;
executing, using threads executed by processor cores of one group which is allocated to one region of the at least two regions, the edge extraction process for the PDL objects contained in the one region, and executing, using threads executed by processor cores of another group which is allocated to another region of at least the two regions, the edge extraction process for the PDL objects contained in the other region.

10. A non-transitory computer-readable medium storing a program therein for causing a computer including a multi-core CPU and capable of performing a process using multiple threads, to perform an image processing method, the method comprising:
performing an edge extraction process as a thread performed by a separate processor core for each object contained in a page;
synthesizing edge information extracted from the PDL objects; and
generating raster image data of the page based on the synthesized edge information obtained by the synthesizing,
wherein
the performing an edge extraction process comprises:
dividing the page into at least two regions each of which contains a plurality of PDL objects;
allocating each of different groups each including processor cores included in the multi-core CPU to each of the at least two regions;
executing, using threads executed by processor cores of one group which is allocated to one region of the at least two regions, the edge extraction process for the PDL objects contained in the one region, and executing, using threads executed by processor cores of another group which is allocated to another region of at least the two regions, the edge extraction process for the PDL objects contained in the other region.

* * * * *